United States Patent [19]

Wright et al.

[11] Patent Number: 5,015,937
[45] Date of Patent: May 14, 1991

[54] PARAMETRIC CURRENT CONTROL FOR MICROSTEPPING UNIPOLAR MOTOR

[75] Inventors: Danny O. Wright, Newport News; Kregg S. Wiggins, Hayes, both of Va.

[73] Assignee: Siemens-Bendix Automotive Electronics L.P., Auburn Hills, Mich.

[21] Appl. No.: 427,270

[22] Filed: Oct. 26, 1989

[51] Int. Cl.⁵ .............................................. H02P 8/00
[52] U.S. Cl. .................................. 318/696; 318/685; 361/27; 310/68 C; 360/78.13
[58] Field of Search ............... 318/696, 685; 361/271; 310/68 C; 368/78.13

[56] References Cited

U.S. PATENT DOCUMENTS

| | | | |
|---|---|---|---|
| 4,721,894 | 1/1988 | Graber | 361/27 X |
| 4,731,680 | 3/1988 | Moriyama et al. | 360/78.13 |
| 4,734,847 | 3/1988 | Hunter | 318/685 X |
| 4,926,077 | 5/1990 | Gauthier et al. | 310/68 C |

Primary Examiner—William M. Shoop, Jr.
Assistant Examiner—Saul M. Bergmann
Attorney, Agent, or Firm—George L. Boller; Russel C. Wells

[57] ABSTRACT

A unipolar motor control system includes motor current regulation derived from monitoring battery voltage and motor temperature. The monitored battery voltage and motor temperature are inputs to a microprocessor control which has one or more look-up tables for developing an appropriate scaling factor that adjusts the voltage across the motor coils so that proper current magnitude is delivered to the motor.

8 Claims, 3 Drawing Sheets

PARAMETRIC CURRENT CONTROL FOR MICROSTEPPING UNIPOLAR MOTOR

BACKGROUND AND SUMMARY OF THE INVENTION

This invention relates to the microstepping control of a unipolar stepping motor.

The inventors' U.S. Pat. No. 4,855,660, commonly assigned, discloses a novel means and method for microstepping of a unipolar stepping motor. The disclosed embodiment of the present invention represents an improvement in regulating the current delivered to the motor.

Conventional current regulation requires directly sensing the current in a motor winding via a sense resistor, Hall sensor, or current transformer. These are wasteful of power and voltage delivery to the motor.

The present invention involves the sensing of motor current indirectly through the measurement of voltage and winding resistance. More specifically, the invention involves the sensing of motor voltage by sensing battery voltage and the sensing of winding resistance by sensing winding temperature. From the measurement of these parameters, the required pulse width modulated (PWM) duty cycle can be calculated for the desired motor current. Advantages of the invention include lower cost, lower voltage drop, smaller size, and lower power dissipation.

The foregoing, along with other advantages, of the invention will be seen in the ensuing description and claims which should be considered in conjunction with the accompanying drawings. The drawings disclose a presently preferred embodiment of the invention according to the best mode contemplated at the present time for carrying out the invention.

DESCRIPTION OF THE PREFERRED EMBODIMENT

Figure 1:
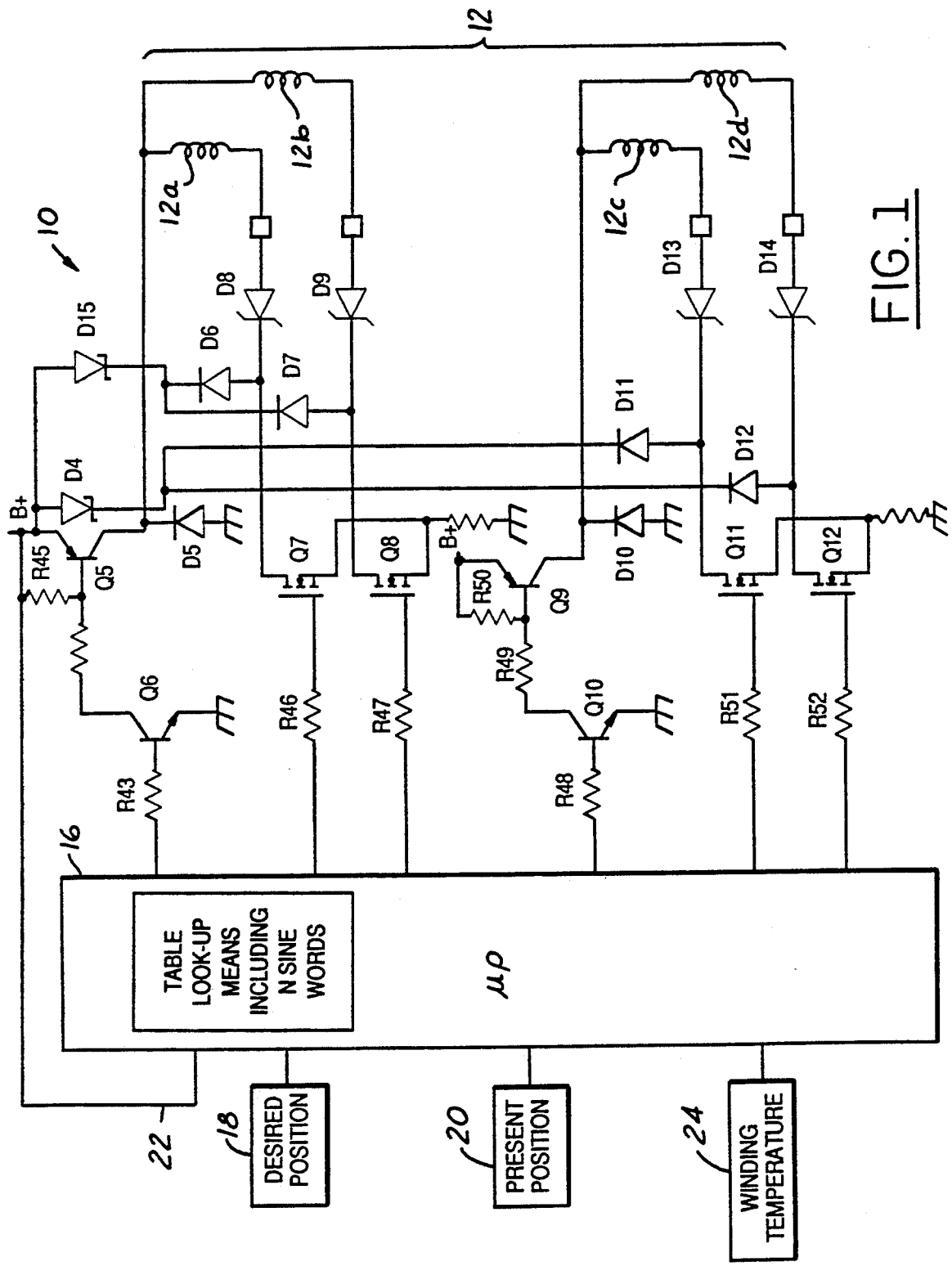
FIG. 1 is a schematic diagram of a unipolar stepping motor control system embodying principles of the invention.

The system 10 comprises a standard unipolar stepping motor 12 that has one pair of oppositely wound coils 12a, 12b constituting one phase winding and another pair of oppositely wound coils 12c, 12d constituting another phase winding. Coils 12a, 12b have a common terminal that connects to the positive battery terminal B+ through a transistor Q5. The other terminal of each coil 12a, 12b connects respectively to the ground battery terminal through a respective transistor Q7, Q8, the two transistors sharing a resistor 14 to ground.

A circuit consisting of resistors R43, R44, R45 and a transistor Q6 controls the conductivity of transistor Q5, with transistor Q6 being itself controlled by a microprocessor 16. Transistors Q7, Q8 are also under the control of microprocessor 16, being coupled thereto via respective resistors R46, R47. Diodes D5, D6, D7, D8, D9, and D15 are also associated in circuit in the manner shown.

The circuitry that is associated with coils 12c, 12d is the exact duplicate of that associated with coils 12a, 12b, and therefore will not be described in detail.

Inputs to microprocessor 16 include a desired position input 18 and a present position input 20. Microprocessor 16 functions to control the energization of the motor coils in like manner to that described in the inventors' aforementioned patent, and reference may be had to that patent for details. Briefly, the motor is caused to be microstepped toward the desired position whenever the desired position differs from the present position because an error signal is generated by the lack of correspondence of the present position signal to the desired position signal.

The operation of the motor includes the delivery of PWM current to the coils. The current must be regulated for optimum performance. The present invention accomplishes this without directly sensing the actual current flow to the coils. Rather, an indication of the current flow is obtained indirectly, and this is done by sensing the voltage delivered to the motor and by sensing the resistance of the coils themselves.

An indication of voltage delivered to the motor is obtained by having the microprocessor sense the B+ battery voltage, as at 22, and an indication of coil resistance by receiving a measurement of the motor coil temperature, as at 24. The coils' resistance is related to temperature, and on the basis of these measurements the microprocessor calculates the current to the coils and regulates said current accordingly. The use of additional sensing devices, such as those mentioned earlier, is thereby avoided. Certain unipolar stepping motors come already equipped with thermistors embedded internally, and advantage is taken of their presence to provide the temperature signal to the microprocessor.

Figure 2A:
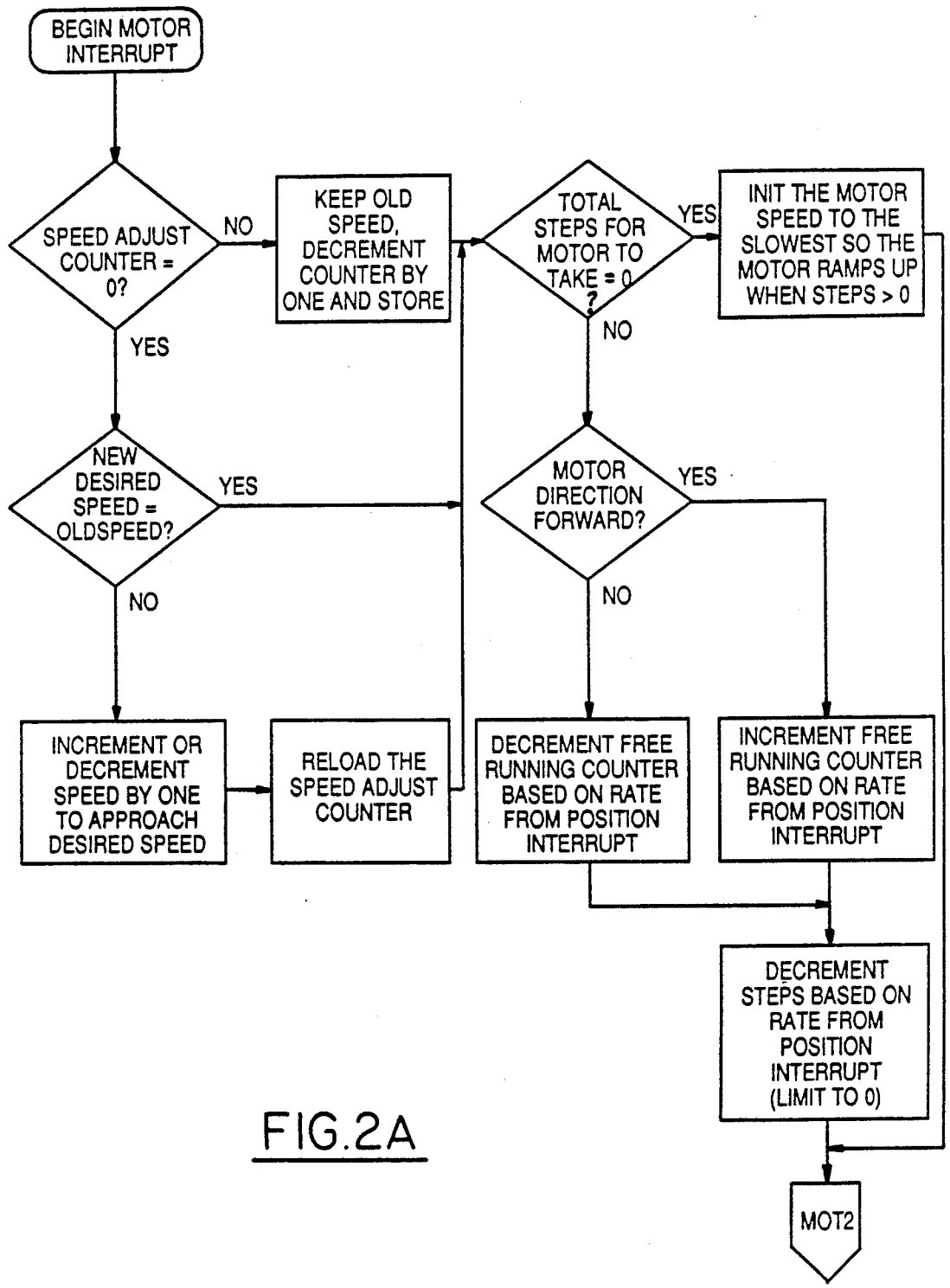
FIGS. 2A and 2B should be considered together as constituting a flow diagram explaining the operation of the system, including in particular the improvement that constitutes the invention.
Figure 2B:
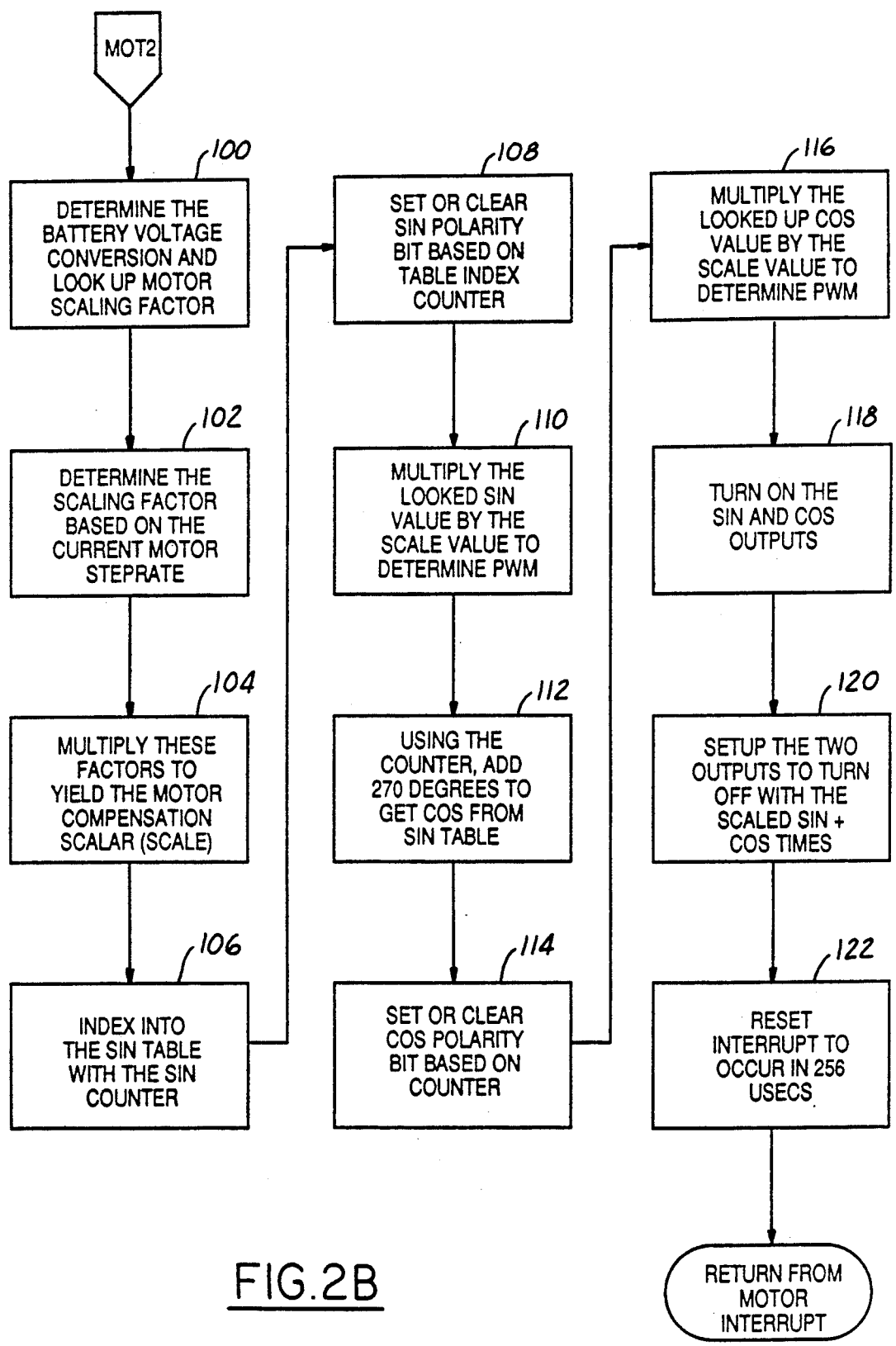

FIG. 2A and 2B are useful in explaining the operation. These FIGS. represent a subroutine that is executed by the microprocessor and is called Motor Interrupt. The steps illustrated in FIG. 2A are like corresponding steps illustrated in FIG. 6 of the inventors' aforementioned patent but with the inclusion of several steps for adjusting the speed adjust counter. The inventive features reside in the portion of the subroutine that is presented in FIG. 2B, and so that FIG. 2B will be described in detail.

The first step 100 comprises two parts: (1) determining the battery voltage conversion and (2) determining a motor scaling factor. In accomplishing this step, the sensed battery voltage at 22 and the sensed motor temperature at 24 are used by the microprocessor to generate corresponding factors. Battery voltage conversion factors are correlated with different levels of battery voltage, and motor scaling factors are correlated with motor temperature. By monitoring the battery voltage, the microprocessor is capable of selecting a corresponding battery conversion factor stored in a medium such as a look-up table. In similar manner the motor scaling factor is determined. The relationship between the battery voltage conversion factor and battery voltage is such that the battery conversion factor bears a generally inverse relationship to battery voltage, in other words, the smaller the battery voltage, the larger the battery voltage conversion factor, and vice versa. The relationship between the motor scaling factor and the sensed motor temperature is such that in general the motor scaling factor varies directly with temperature, in other words, the higher the temperature, the larger the motor scaling factor.

A third factor is determined by step 102 and this comprises determining a scaling factor that is based on the current motor step rate. The purpose of this third factor is to compensate for the motor time constant and back EMF.

The three factors are multipled together in step 104 to yield the motor compensation scalar (SCALE). It is SCALE that is used to adjust the current to the motor and thereby provide current regulation.

The system operates to deliver sine and cosine outputs to the respective coils for accomplishing proper motor operation in the same manner as described in the inventors' aforementioned patent. Discrete sine and cosine values of control current over a range of 360 degrees are generated by a means therefor, as described in the inventors' aforementioned patent. Particular values are selected in accordance with the desired operation of the motor. Operation of transistor Q5 enables a selected one of coils 12a, 12b to be energized when the corresponding transistor Q7 or Q8 is operated; similarly, the operation of transistor Q9 enables a selected one of coils 12c, 12d to be energized when the corresponding transistor Q11 or Q12 is operated. The microprocessor serves to cause a first one of transistors Q7, Q8, Q11, Q12 to be conductive for only positive sine values of control current, a second one of said transistors to be conductive for only negative sine values of control current, a third one of said transistors to be conductive for only positive cosine values of control current, and a fourth one of said transistors to be conductive for only negative cosine values of control current. The system comprises table look-up means from which a signal indicating an angular rotating of the motor is given in response to the stepping rate which is to be executed by the motor, and in response to the looked-up signal from the table look-up means, power is supplied to each winding for causing the motor to rotate to the desired position. The table look-up means comprises a table of N words of sine values. The improvement provided by the present invention is that these sine and cosine values are compensated for the three factors that have just been described, and such compensation takes place by controlling the conductivities of the transistors Q5, Q9. Thus the steps 106, 108 determine the sine value, while the step 110 multiplies the determined sine value by the determined SCALE factor. In similar manner, steps 112, 114 determine the cosine value, while the step 116 multiplies the determined cosine value by the determined SCALE factor. The regulation that is afforded is the adjustment of the PWM voltage output appearing across the selected motor coils such that the proper current is delivered to each of the selected motor coils. The remaining steps 118, 120, 122 conclude the subroutine, and the system delivers the proper current to the motor.

Thus, the current to the motor is regulated to compensate for variations in battery voltage and in motor coil resistance. The invention is employed in a motor vehicle throttle control system where the stepping motor positions the throttle blade as commanded by the positioning of the accelerator pedal. While a preferred embodiment of the invention has been disclosed, it should be appreciated that principles are applicable to other embodiments.

What is claimed is:

1. A unipolar stepping motor control system comprising in combination:

a unipolar stepping motor comprising a two phase winding, each phase winding having two oppositely wound coils, said motor having a shaft that rotates a driven member;

present position sensor means effective to generate a signal indicating the present position of said driven member;

desired position generator means effective to generate a signal indicating the desired position of said driven member;

means, including a microprocessor, responsive to said signals for generating an error signal indicative of the difference between the present position and the desired position of said driven member to cause said stepping motor to drive said driven member to said desired position;

means for generating discrete sine and cosine values of a control current over a range of 360 degrees;

for each of said coils, a corresponding controlled conduction device for controlling the flow of current in the corresponding coil, the controlled conduction devices being under the control of said microprocessor;

said microprocessor serving to cause a first one of said controlled conduction devices to be conductive for only positive sine values of said control current, a second one of said controlled conduction devices to be conductive for only negative sine values of said control current, a third one of said controlled conduction devices to be conductive only for positive cosine values of said control current, and a fourth one of said controlled conduction devices to be conductive only for negative cosine values of said control current;

said system further including current regulating means for regulating the control current in each of said coils, said current regulating means comprising voltage sensing means, supplied to said microprocessor, for sensing the voltage of a D.C. supply that supplies the control current to said coils via said controlled conduction devices, and temperature sensing means, supplied to said microprocessor, for sensing motor temperature proximate said phase windings, and said microprocessor serving to operate said controlled conduction devices such that current to said coils is regulated in a manner causing motor operation to be substantially insensitive to fluctuations in motor temperature and in D.C. supply voltage.

2. A system as set forth in claim 1 in which said current regulating means includes a fifth controlled conduction device associated in circuit with two of the first four controlled conduction devices and their corresponding coils and a sixth controlled conduction device associated in circuit with the other two of said first four controlled conduction devices and their corresponding coils, the conductivities of said fifth and sixth controlled conduction devices being under the control of said microprocessor for regulating the magnitude of current flow to the motor when particular ones of said coils are selected by particular ones of said first through fourth controlled conduction devices.

3. A system for controlling a unipolar stepping motor comprising:

a unipolar stepping motor having a two phase winding and an output shaft connected to a driven member, said driven member operable to be rotated to a desired position;

position sensor means coupled to said driven member and operable to generate a signal indicating the present position of said driven member;

desired position signal generator means operable to generate a signal indicating the desired position of said driven member;

means responsive to each of said signals for generating an error signal indicative of the difference in said present and desired positions of said driven member;

means responsive to said error signal for generating a number of steps for said motor;

table look-up means responsive to said number of steps for generating one of a plurality of signals representing the pulse period for said motor;

means responsive to said signal from said table look-up means for supplying electrical power to said motor for rotating said driven member to said desired position;

wherein there is also included regulating means for regulating said means for supplying electrical power to said motor against fluctuations in motor temperature and in the magnitude of a D.C. supply voltage that powers said motor.

4. A system as set forth in claim 3 wherein said regulating means comprises a thermal sensor disposed in said motor proximate said winding.

5. A method for controlling a unipolar stepping motor having a two phase winding and an output shaft connected to a driven member operable to be rotated to a desired position comprising the steps of:

coupling a position sensor means to the driven member for generating a signal indicating the present position of the driven member;

generating a signal representing the desired position of the driven member;

calculating the difference between the desired position and the present position of the driven member;

responding to the magnitude of the difference for generating a stepping rate for the motor;

looking-up in a table in response to a stepping rate of the motor for a signal indicating an angular rotation of the motor; and then responding to said signal from the table look-up for supplying power to each winding of the motor for rotating the driven member to the desired position; and wherein the step of looking-up, the table is N words of sine values for indicating the angular rotation of the motor; and including the step of regulating against fluctuations in the voltage of a D.C. supply that powers the motor and in the temperature of the motor, said regulating step comprising sensing the D.C. supply voltage, sensing the motor temperature, and then setting, in accordance with the sensed D.C. supply voltage and the sensed motor temperature, the duty cycle of a pulse width modulated current that is delivered from said D.C. supply to said motor.

6. The method as set forth in claim 5 in which the sensing of the motor temperature is conducted by a sensing device disposed proximate the motor windings.

7. A unipolar stepping motor control system comprising in combination:

a unipolar stepping motor comprising a two phase winding, each phase winding having two oppositely wound coils, said motor having a shaft that rotates a driven member;

present position sensor means effective to generate a signal indicating the present position of said driven member;

desired position generator means effective to generate a signal indicating the desired position of said driven member;

means, including a microprocessor, responsive to said signals for generating an error signal indicative of the difference between the present position and the desired position of said driven member for causing said driven member to be driven to the desired position;

controlled conduction devices in circuit relationship between said motor coils and a D.C. voltage supply that supplies current to said motor coils, said circuit from said supply being free of electrical devices other than said controlled conduction devices and said motor coils, said controlled conduction devices being under the control of said microprocessor for driving said driven member to said desired position;

said system further including current regulating means for regulating the control current in each of said coils, said current regulating means comprising voltage sensing means, supplied to said microprocessor, for sensing the voltage of said D.C. supply, and temperature sensing means, supplied to said microprocessor, for sensing motor temperature proximate said winding, and said microprocessor comprising means to operate said controlled conduction devices such that current to said coils is pulse width modulated so as to be substantially insensitive to fluctuations in motor temperature and in the voltage of said D.C. supply.

8. A system as set forth in claim 7 in which motor temperature is sensed by means of a temperature sensing device disposed in said motor proximate said winding.

* * * * *